May 28, 1968  N. E. MUNKSTRAND  3,385,558

CONTROL DEVICE FOR A FLOW GATE

Filed Oct. 20, 1965  3 Sheets-Sheet 2

INVENTOR
NILS ERIC MUNKSTRAND

BY  Hame and Kjdick

ATTORNEYS

United States Patent Office 3,385,558
Patented May 28, 1968

3,385,558
CONTROL DEVICE FOR A FLOW GATE
Nils Eric Munkstrand, Trollhattan, Sweden, assignor to Nydqvist & Holm Aktiebolag, Trollhattan, Sweden, a corporation of Sweden
Filed Oct. 20, 1965, Ser. No. 498,753
Claims priority, application Sweden, Oct. 23, 1964, 12,817/64
9 Claims. (Cl. 251—29)

The present invention relates to a mechanism for closing gates upon a failure of pressure in a hydraulic system controlling the gates. Such gates are used, for example, in conjunction with water turbines and pumps and are the means which control the flow of water to the runner of the turbine. For example, if in operation the loading on the turbine generator is reduced, a governor system turns the gates toward their closing positions, whereby the spacing between the gates is reduced and the flow of water is decreased.

The control power necessary to adjust the gates is practically always taken from hydraulic devices, and in large turbines it amounts to considerable values, such as 1 megajoule or more. If for some reason the pressure in the hydraulic system fails, the gates must be closed automatically in some way. The present invention solves this problem in the manner disclosed hereinafter and set forth in the appended claims.

If the supply of hydraulic fluid for some reason fails, the mechanism of the invention closes the gates. Furthermore, the mechanism forms an overspeed control, since the self-closing gates move toward closing as soon as the actuator means operates, whereby the turbine stops. Thereby it will be possible, from the point of view of protection, to dispense with the rapidly closing intake door and to use more simple arrangements if it be desired to inspect or repair the turbines. Finally, the gates cannot open by themselves due to the action of the water pressure, and a locking mechanism for the gates may be dispensed with.

The invention will be described more in detail with reference to the accompanying drawing, wherein.

Figure 1:
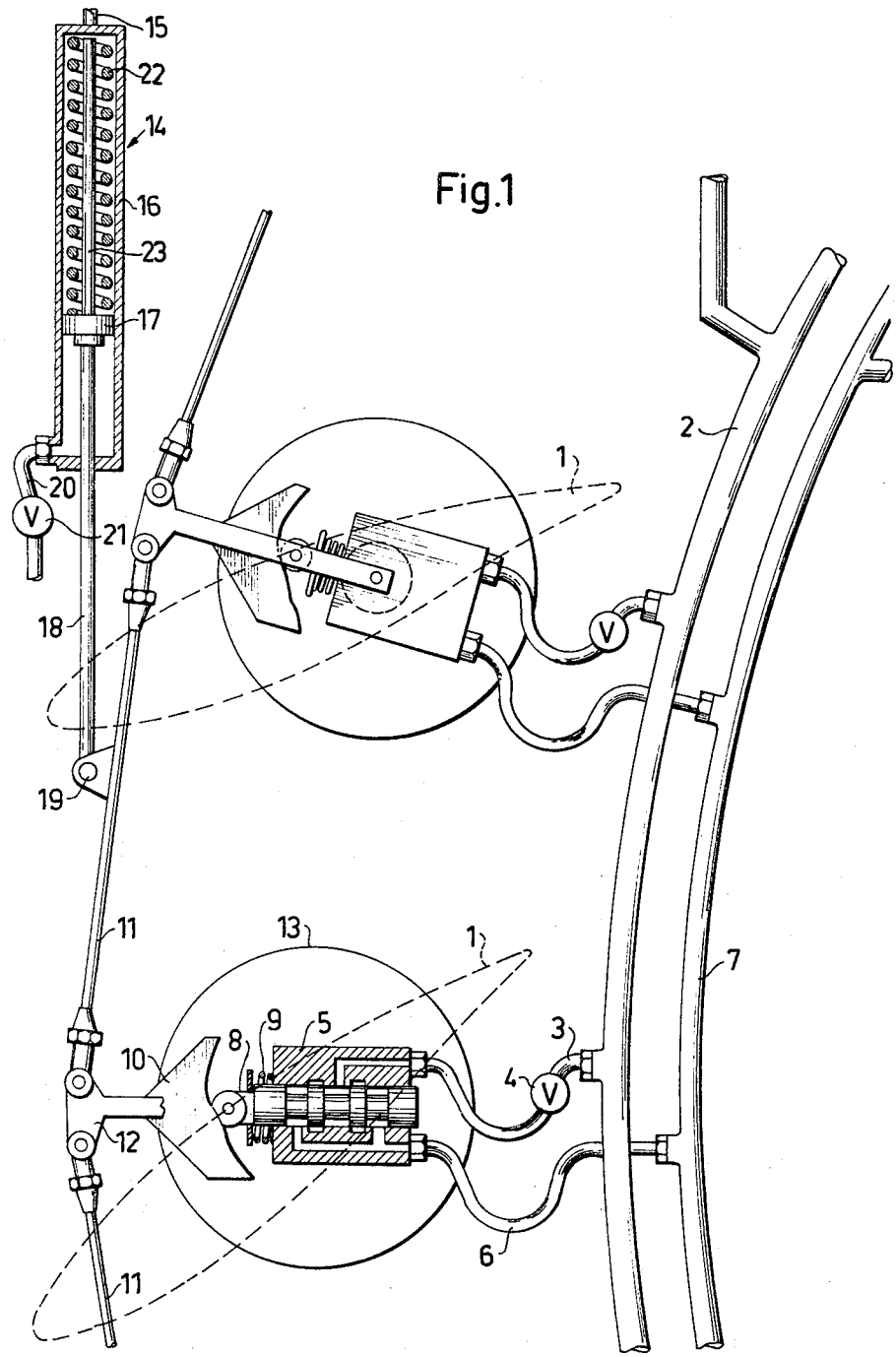
FIG. 1 shows an embodiment of the invention in plan view, partly in section.

In the embodiment here described and illustrated in FIG. 1, there is used a system comprising a separate hydraulic servomotor for each gate. The valve housing of the valve controlling each motor is rigidly connected to the associated gate so that it follows the turning movement of the gate. This results in a complete uniformity of the turning movement and smooth operation of all the gates.

FIG. 1 shows a portion of the gate ring with two gates 1. High pressure oil is supplied through a main conduit 2 wherefrom a flexible tube 3 extends to each valve housing 5 through a check valve 4. The return oil flows through a flexible tube 6 to the main conduit 7. In the valve housing, an axial slide 8 is provided. It is biased by a helical spring 9 and engages a cam 10. This cam is connected to a control chain consisting of links 11 which connect the levers 12 on which the cams are attached. Instead of this type of control valves with axial slides and cams, control valves having rotary slides may also be used.

The type of servomotor herein used is a rotary piston motor 13, but of course a piston-cylinder device having a linearly movable piston may also be used. The valve housing 5 is rigidly connected to the rotary piston on the rotary piston motor 13, which in turn is rigidly connected to the gate.

An actuator member 14 in the form of a piston-cylinder is provided on a control rod 15 belonging to the governor system of the turbine, said rod being rigidly connected to a cylinder 16 of the actuator. A piston 17 of the actuator is pivotally connected at 19 by a piston rod 18 to one of the links 11 of the control chain. The cylinder space which in operation is under a high oil pressure is connected through a conduit 20 to an overspeed switch, a safety shutdown system or similar means over a reducing valve 21. The piston 17 is biased against the oil pressure by a helical spring 22. A stop member in the form of a rod 23 is provided at the spring side of the piston to limit compression of the spring 22 by the oil pressure.

Figure 2:
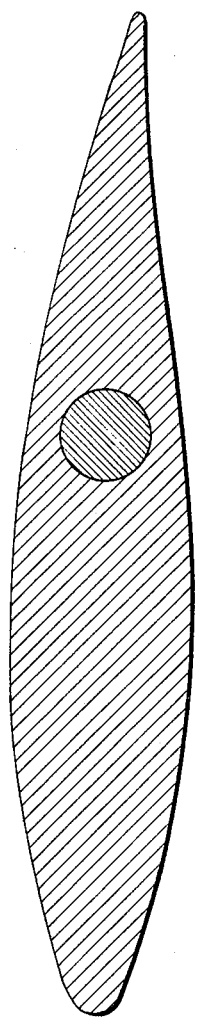
FIG. 2 shows a gate profile in section.

The shape of the self-closing gates is seen from FIG. 2, which shows a profile suitable for the purpose.

Figure 3:
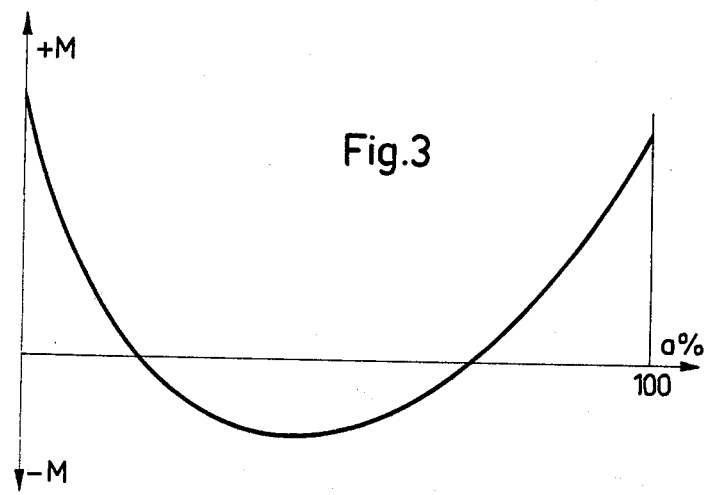
FIGS. 3 to 5 show moment curves for the opening or closing of three different gates.
Figure 4:
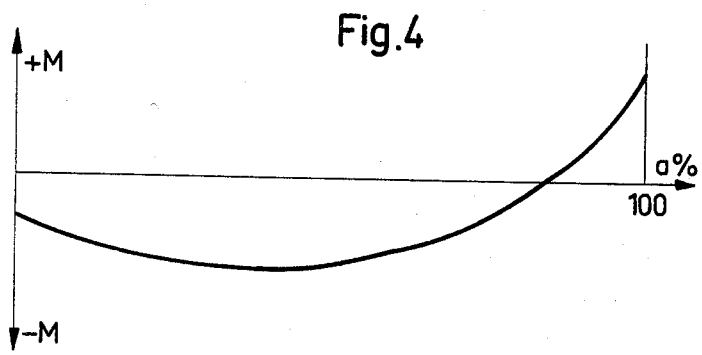
Figure 5:
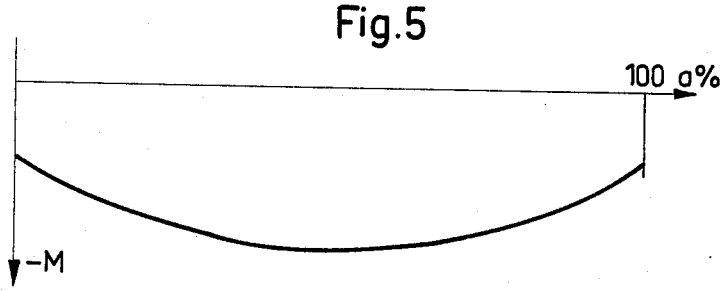

FIGS. 3 to 5 show moment curves for closing or opening three different types of gates. Along the horizontal axis of each graph the gate opening $a$ is shown percentage, and along the vertical axis the opening moment $+M$ and the closing moment $-M$ are shown.

Gates of conventional construction have a moment curve which is shown in principle in FIG. 3. It may be seen therefrom that the gates for very small openings have an opening moment; that is, they tend to be opened by the water pressure. Therefore, a mechanism for locking the gates in their closing positions is generally required to prevent self-opening by the water pressure if the oil pressure fails.

To avoid such self-opening, it is possible to balance the gate hydraulically so that in the closing position it has a great excess moment toward closing. The moment curve for such a gate is shown in FIG. 4. Self-opening under the influence of the water pressure will then be impossible, and the locking mechanism can be dispensed with.

A further improvement is achieved by the gate of this invention, which provides a closing moment at all gate openings (FIG. 5). Accordingly, if the adjusting force disappears for some reason, the gates will close regardless of the size of the opening. With such gate constructions, the same high efficiency as before is obtained.

The mechanism as hereinbefore described functions in the following manner:

If the hydraulic system for some reason is without pressure, the self-closing gates will move toward the closing position. To assure that such closing is not prevented by oil trapped in the control valves, they must also be biased for closing. This is achieved by the actuator 14, the spring 22 of which moves the piston 17 toward the cylinder end wall since the cylinder 16 is not under pressure. In this manner, the control chain with the cams 10 is moved by the piston rod 18 toward the closing position.

Since the conduit 20 is connected to the overspeed switch or safety shutdown mechanism, the actuator 14 may also be used to close the gates quickly, even when the pressure failure does not prevail.

The invention is not limited to the embodiment shown and described. Thus, the actuator may, for instance, comprise any device for storing a force (weight, spring or other compressed medium) which is released mechanically, magnetically or hydraulically on failure of the pressure in the hydraulic system. Furthermore, the invention may be employed in installations where several gates are controlled by one servomotor.

What is claimed is:

1. A control device for controlling the position of a flow gate exposed in operation to a fluid flow, said device comprising, in combination, a gate movable between an open position and a closed position and having a configuration such that the hydrostatic and hydrodynamic forces acting upon the gate when exposed to the operational fluid flow bias the gate into its closed position, hydraulic servomotor means coupled to said gate, said servomotor means, when activated, retaining the gate in its open position against said forces, a first conduit means for supplying a flow of pressure fluid to said servomotor means to activate the same, said servomotor means comprising a control valve means included in said conduit means for controlling the fluid flow therethrough, a hydraulic actuator means controlling the position of said valve means, said actuator means including a directional force means coacting with said control valve means to bias the same into a flow-closing position, and a second conduit means for supplying a flow of pressurized fluid to said actuator means to hold the same in a position in which said control valve means is in a flow-opening position against the action of said directional force means, a failure of the flow of pressure fluid to the actuator means releasing the directional force means thereof to move said control valve means into its flow-closing position, thereby freeing the gate for moving into its closing position by the action of the forces acting thereupon.

2. A control device according to claim 1, wherein said servomotor means is fixedly mounted on said gate for moving in unison with the same.

3. A control device according to claim 1 and comprising a plurality of said gates and a plurality of said servomotor means, each of which is mounted on one of said gates to control the position thereof, and a common transmission means operatively connecting said actuator means to each of said control valve means for simultaneously controlling all said valve means by said actuator means.

4. A control device according to claim 3, wherein said common transmission means comprises a displaceable link chain, said chain being coupled to said actuator means for displacement of the chain by the directional force means of the actuator means upon failure of the fluid pressure applied to the actuator means and being also coupled to each of said control valve means for moving the same into the flow-closing position upon displacement of the chain.

5. A control device according to claim 4, wherein each of said control valve means comprises a valve housing and a movable valve member, the position of the valve member in the housing controlling the open and the closed position of the valve means, and wherein said chain is lengthwise displaceable and cam means are interposed between said chain and each of said valve members, each of said cam means including a cam member and a follower member coacting with the cam member, one of said members of each cam means being secured to one link of the chain and the other to the respective valve member for simultaneously operating all the control valve means upon displacement of said chain.

6. A control device according to claim 1, wherein said actuator means comprises a cylinder, and a piston slidable in the same, the directional force means biasing the piston into a position in the cylinder in which said control valve means is in its flow-closing position, the fluid pressure in said second conduit means retaining said piston against the action of said directional force means in a position in which the control valve means is in its flow-opening position.

7. A control device according to claim 6, wherein said directional force means is a loaded coil spring in said cylinder.

8. A control device according to claim 6 and comprising a limit means for limiting displacement of the piston in the cylinder by the pressure of the fluid fed to the cylinder by said second conduit means.

9. A control device according to claim 8, wherein said limit means comprises a stop rod secured to the piston on the side thereof opposite said piston rod, said stop rod abutting against an end wall portion of the cylinder when the pressure of the fluid fed to the cylinder by the second conduit means is above a predetermined level.

References Cited
UNITED STATES PATENTS 2,081,542  5/1937  Kidney _____ 251—32 X M. CARY NELSON, *Primary Examiner.*

ARNOLD ROSENTHAL, *Examiner.*